US012715372B2

(12) United States Patent
Tseng et al.

(10) Patent No.: US 12,715,372 B2
(45) Date of Patent: Aug. 25, 2026

(54) NOISE CONTROL STRUCTURES FOR VEHICLE FASCIA COMPONENTS

(71) Applicant: Honda Motor Co., Ltd., Tokyo (JP)

(72) Inventors: Tzu-Pu Tseng, Marysville, OH (US); Nicholas H. Goldsberry, Powell, OH (US); Brian A. Penza, Powell, OH (US); Liza G. Bare, Powell, OH (US); Austin B. Kimbrell, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 584 days.

(21) Appl. No.: 18/342,126

(22) Filed: Jun. 27, 2023

(65) Prior Publication Data

US 2025/0001954 A1 Jan. 2, 2025

(51) Int. Cl.
*B60R 13/00* (2006.01)
*B60R 13/10* (2006.01)

(52) U.S. Cl.
CPC .......... *B60R 13/005* (2013.01); *B60R 13/105* (2013.01)

(58) Field of Classification Search
CPC .................................................... B60R 13/005
USPC .................................................... 296/193.09
See application file for complete search history.

(56) References Cited

U.S. PATENT DOCUMENTS 8,702,135 B2 * 4/2014 Gaboury ............... B60R 13/005 293/121
9,371,874 B2 * 6/2016 Previtali ............... F16D 55/228
9,827,934 B2 * 11/2017 Maier .................... B60K 11/04
9,834,155 B2 12/2017 Gong
10,323,817 B2 6/2019 Thoday et al.
10,988,099 B2 * 4/2021 Ohki ..................... B60R 13/005
11,046,257 B1 6/2021 Fattouche
11,453,352 B2 * 9/2022 Albergaria ............. F21S 43/19
2015/0122572 A1 5/2015 Niwa
2022/0219623 A1 7/2022 Hirotani et al.
2023/0339420 A1 * 10/2023 Kutchey ................. G09F 13/04

FOREIGN PATENT DOCUMENTS

EP 3753785 A1 12/2020
JP 5656581 B2 1/2015
JP 6733165 B2 7/2020
KR 200403775 Y1 12/2005
KR 200432005 Y1 11/2006
KR 20130048535 A 5/2013
KR 102005738 B1 7/2019
KR 102308552 B1 10/2021
WO 2006114298 A1 11/2006
WO 2018038350 A1 3/2018
WO 2020208105 A1 10/2020

* cited by examiner

*Primary Examiner* — Amy R Weisberg
*Assistant Examiner* — Philip C Adams
(74) *Attorney, Agent, or Firm* — Plumsea Law Group, LLC

(57) ABSTRACT

A recessed portion of a vehicle surface may include an upper edge portion surrounding a portion of the recessed portion, an inner wall of the recessed portion, a plurality of dentil protrusions extending from the inner wall, and a fascia component disposed in a portion of the recessed portion, wherein a gap is disposed between the fascia component and the upper edge portion, wherein at least some of the plurality of dentil protrusions are a disposed in an air channel defined by the gap.

11 Claims, 6 Drawing Sheets

NOISE CONTROL STRUCTURES FOR VEHICLE FASCIA COMPONENTS

BACKGROUND

1. Field of the Disclosure

The present disclosure relates to noise control structure, and more particularly to a noise control structure for a vehicle fascia component.

2. Description of Related Art

Many vehicle assemblies have a shortcoming wherein noise is transmitted into a vehicle passenger compartment. This noise may be road noise resulting from tires rolling over a road surface or wind noise resulting from air moving past the vehicle. One type of the wind noise is buffeting, which may result from air rushing over an opening in a cavity and is generally characterized by relatively low-frequency noise. Another type of wind noise may result from air rushing against, around, or through obstructions at higher vehicle speeds and is generally characterized by high-frequency noise.

Vehicle design takes into account numerous engineering and design concerns, including noise control. Noise control design may include using materials for reducing intrusion of road noise into a cabin area and structures for reducing wind noise. In some cases, noise control designs for reducing wind noise may include seals. However, these seals may be costly, difficult to install, and lack durability.

There is a need in the art for a noise countermeasure for vehicle assemblies that can reduce, tune, or eliminate wind noise.

SUMMARY OF THE INVENTION

Embodiments of the present disclosure are directed to noise countermeasures for a vehicle. In one aspect, a plurality of dentil protrusions create a turbulent air flow that reduces, tunes, or eliminates wind noise. In one aspect, a plurality of indentures create a turbulent air flow that reduces, tunes, or eliminates wind noise. In one aspect, a blocking material may be disposed in a void, where the blocking material reduces, tunes, or eliminates wind noise.

In some aspects, a recessed portion of a vehicle surface may include: an upper edge portion surrounding a portion of the recessed portion; an inner wall of the recessed portion; a plurality of dentil protrusions extending from the inner wall; and a fascia component disposed in a portion of the recessed portion, wherein a gap is disposed between the fascia component and the upper edge portion and at least some of the plurality of dentil protrusions are a disposed in an air channel defined by the gap.

In some aspects, a recessed portion of the vehicle surface may include an intermediate surface extending around a portion of the inner wall below the upper edge portion.

In some aspects, the plurality of dentil protrusions may be formed on the intermediate surface.

In some aspects, a recessed portion of a vehicle surface may include a lower surface extending from the inner wall, wherein the intermediate surface is disposed between the lower surface and the upper edge portion. In some aspects, the fascia component may include a service clip extending through an opening in the lower surface.

In some aspects, a recessed portion of the vehicle surface may include a curved intermediate portion extending from the intermediate surface into the recessed portion. In some aspects, the plurality of dentil protrusions may be formed on the curved intermediate portion.

In some aspects, the plurality of dentil protrusions may have a height between about 0.5 millimeters and about 1.5 millimeters and may have a spacing between adjacent ones of the dentil protrusions between about 2 millimeters and about 8 millimeters.

In some aspects, the plurality of dentil protrusions may have a height of about 1 millimeter and may have a spacing between adjacent ones of the dentil protrusions between about 5 millimeters.

In some aspects, the fascia component may include: a house structure extending to a rear of the fascia component; a void disposed between the house structure and a front portion of the fascia component; and a blocking material disposed in the void.

In some aspects, a recessed portion of a vehicle surface may include: an upper edge portion surrounding a portion of the recessed portion; an inner wall of the recessed portion; a lower edge portion extending around a portion of the inner wall below the upper edge portion; a plurality of indentures formed in the lower edge portion and extending from the inner wall; and a fascia component disposed in a portion of the recessed portion, wherein a gap is disposed between the fascia component and the upper edge portion and at least some of the plurality of indentures are a disposed in an air channel defined by the gap.

In some aspects, a recessed portion of the vehicle surface may include a lower surface extending from the inner wall, wherein the lower edge portion is disposed between the lower surface and the upper edge portion. In some aspects, the fascia component may include a service clip extending through an opening in the lower surface.

In some aspects, the plurality of indentures may have a depth between about 0.5 millimeters and about 1.5 millimeters from an upper surface of the lower edge portion and may have a spacing between adjacent ones of the indentures between about 2 millimeters and about 8 millimeters.

In some aspects, the plurality of indentures may have a depth of about 1 millimeter from an upper surface of the lower edge portion and may have a spacing between adjacent ones of the indentures of about 5 millimeters.

In some aspects, the fascia component may include: a house structure extending to a rear of the fascia component; a void disposed between the house structure and a front portion of the fascia component; and a blocking material disposed in the void.

In some aspects, a fascia component for a vehicle may include: a front portion; a house structure extending to a rear of the fascia component, away from the front portion; a void disposed between the house structure and the front portion of the fascia component; and a blocking material disposed in the void.

In some aspects, the fascia component may be disposed in a recessed portion of a surface of the vehicle.

In some aspects, the recessed portion may include: an upper edge portion surrounding a portion of the recessed portion; an inner wall of the recessed portion; and a plurality of dentil protrusions extending from the inner wall, wherein the fascia component is disposed in a portion of the recessed portion, and wherein a gap is disposed between the fascia component and the upper edge portion and at least some of the plurality of dentil protrusions are a disposed in an air channel defined by the gap.

In some aspects, the recessed portion may include: an upper edge portion surrounding a portion of the recessed portion; an inner wall of the recessed portion; a lower edge portion extending around a portion of the inner wall below the upper edge portion; and a plurality of indentures formed in the lower edge portion and extending from the inner wall, wherein the fascia component is disposed in a portion of the recessed portion, and wherein a gap is disposed between the fascia component and the upper edge portion and at least some of the plurality of indentures are a disposed in an air channel defined by the gap.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

A vehicle may move through air in an environment. The movement of the vehicle may create an apparent wind. For example, the apparent wind may be related to the speed of the vehicle through the air. The apparent wind may flow across structures of the vehicle. In some cases, the air flowing against and around the vehicle can be deflected by the structures of the vehicle. As the air flows against, around, or through these structures can create whistling noises.

Examples of the structures of the vehicle that may whistle may include protrusions from a surface of the vehicle. Other examples of the structures of the vehicle that may whistle may include openings or gaps in the surface of the vehicle. The surface of the vehicle may be, for example, a bumper of a car, a grille of a truck, a nose cone of an aircraft, or an outboard engine cowling.

The surface of the vehicle may have one or more fascia components. These fascia components may include grille assemblies, grille surrounds, air intakes, diffusors, air splitters, light assemblies, emblems, and radar covers. Embodiments of the present application are not limited to these examples, and other components are contemplated.

Herein, a vehicle may include a car, a truck, a sports utility vehicle, a motorcycle, a personal watercraft, or an airplane. Embodiments of the present application are not limited to these examples, and other vehicles are contemplated.

Figure 1:
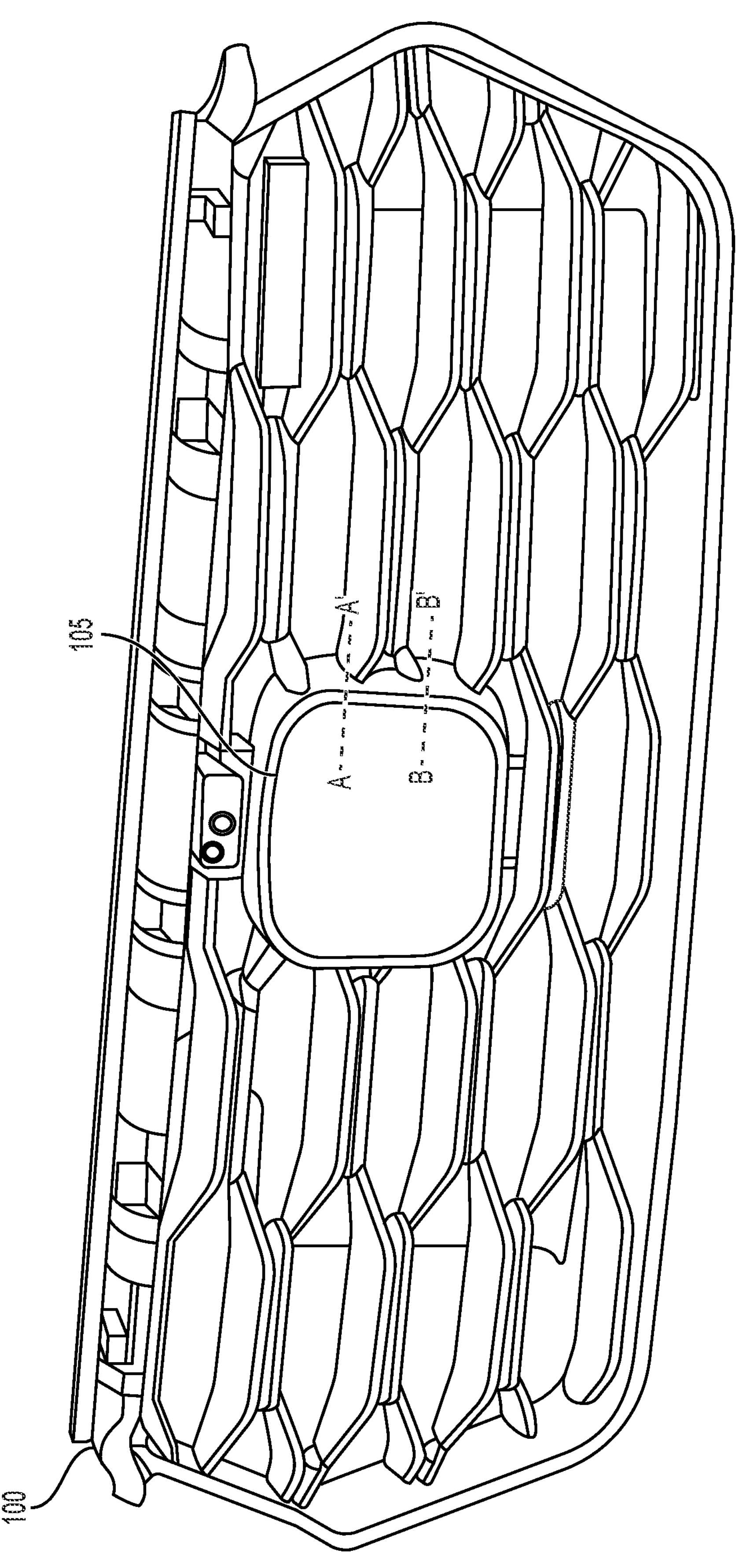
FIG. 1 illustrates a grille assembly and a fascia component according to some embodiments.

Referring to FIG. 1, a vehicle includes a grille assembly 100. The grille assembly 100 may include one or more attachment points for additional fascia components. For example, the grille assembly 100 may include a fascia component 105. In some example, the fascia component 105 may be removably secured to the grille assembly 100. In another example, the fascia component 105 may be permanently fixed to the grille assembly 100.

Figure 2:
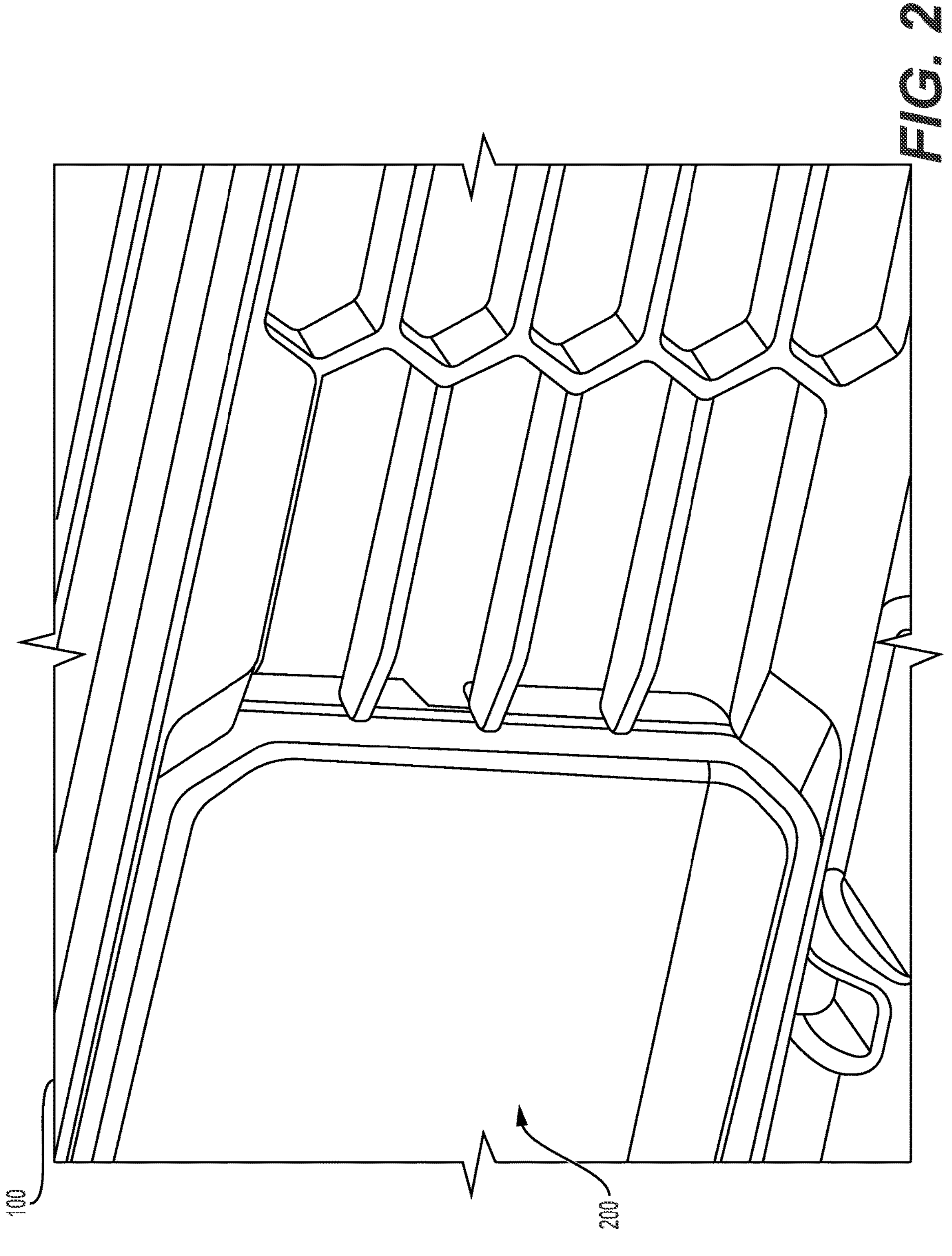
FIG. 2 illustrates a grille assembly according to some embodiments.

As illustrated in FIG. 2, the grille assembly 100 includes a recessed portion 200. The fascia component 105 may fit within the recessed portion 200. According to some embodiments, the recessed portion 200 may be formed in any fascia component forming a portion of a surface of the vehicle. For example, the recessed portion 200 may be formed in a bumper fascia, a hood panel, a roof panel, or a side-view mirror cover. In some embodiments, the recessed portion 200 may be formed in a base fascia component that is configured to receive the fascia component 105.

Figures 6, 7:
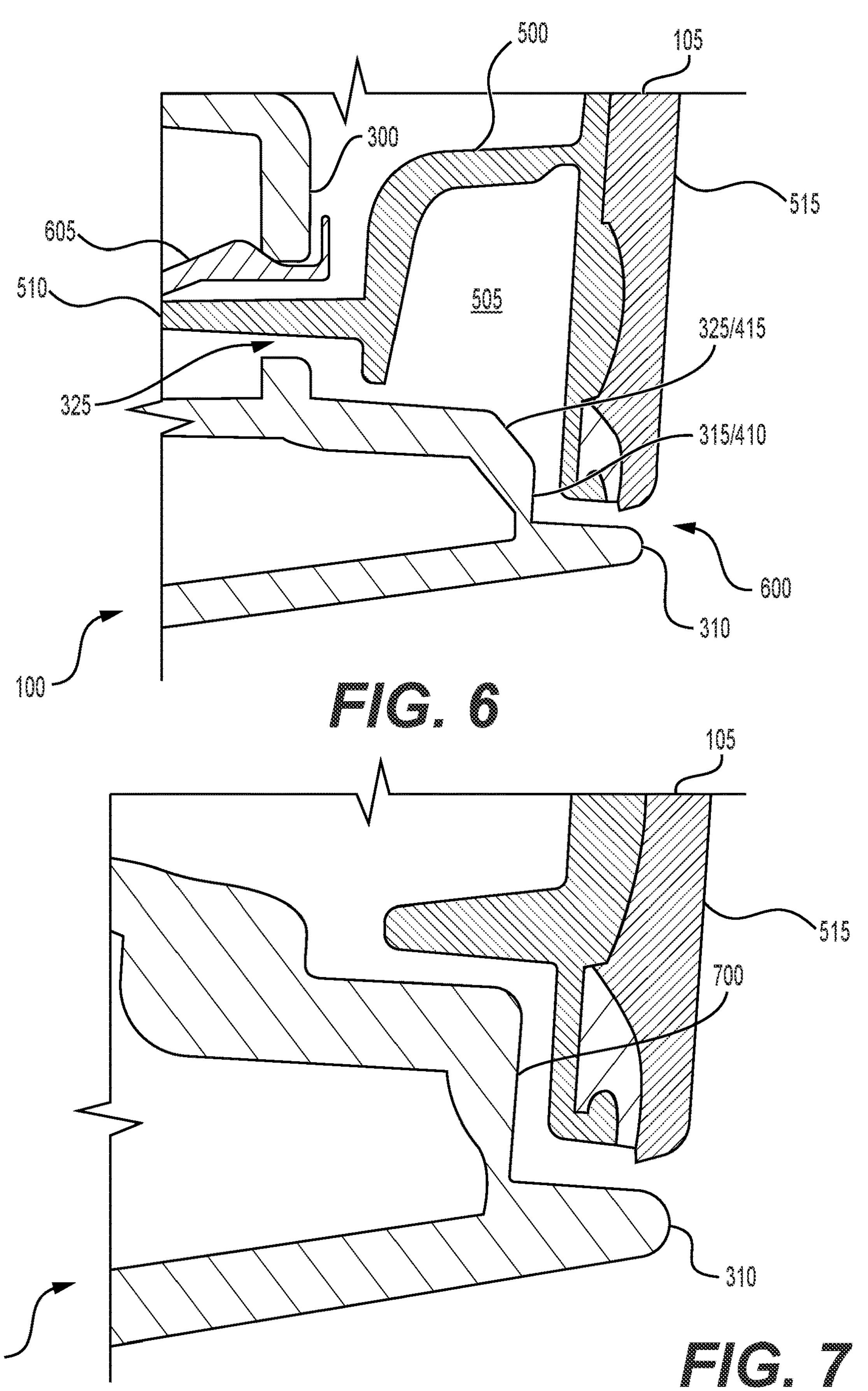
FIG. 6 illustrates a cross section a grille assembly and a fascia component according to some embodiments.
FIG. 7 illustrates a cross section of a grille assembly and a fascia component according to some embodiments.

FIG. 1 illustrates a first cross-section line A-A' and a second cross-section line B-B'. FIG. 6 illustrates a cross section of the grille assembly 100 and the fascia component 105 at line A-A' according to some embodiments. FIG. 7 illustrates a cross section of the grille assembly 100 and the fascia component 105 at line B-B' according to some embodiments.

As illustrated in FIG. 6, a gap 600 may be formed between the grille assembly 100 and the fascia component 105. The gap 600 may extend around a portion of the fascia component 105. The gap 600 may completely surround the fascia component 105 in the recessed portion 200. In some cases, air flowing into the gap 600 may cause a whistling noise. For example, air flowing through an air channel defined by the gap and flowing behind the fascia component 105 may cause a whistling noise. In some cases, air flowing into or across a void 505 (see FIG. 6) may cause a whistling noise. For example, air flowing through an air channel defined by the gap and flowing into and by the void 505 may cause a whistling noise.

According to some embodiments, one or more countermeasures may tune, reduce, or prevent a noise caused by air flowing against, around, or through structures of the vehicle. For example, FIG. 3 illustrates a dentil shape noise countermeasure according to some embodiments.

Figure 3:
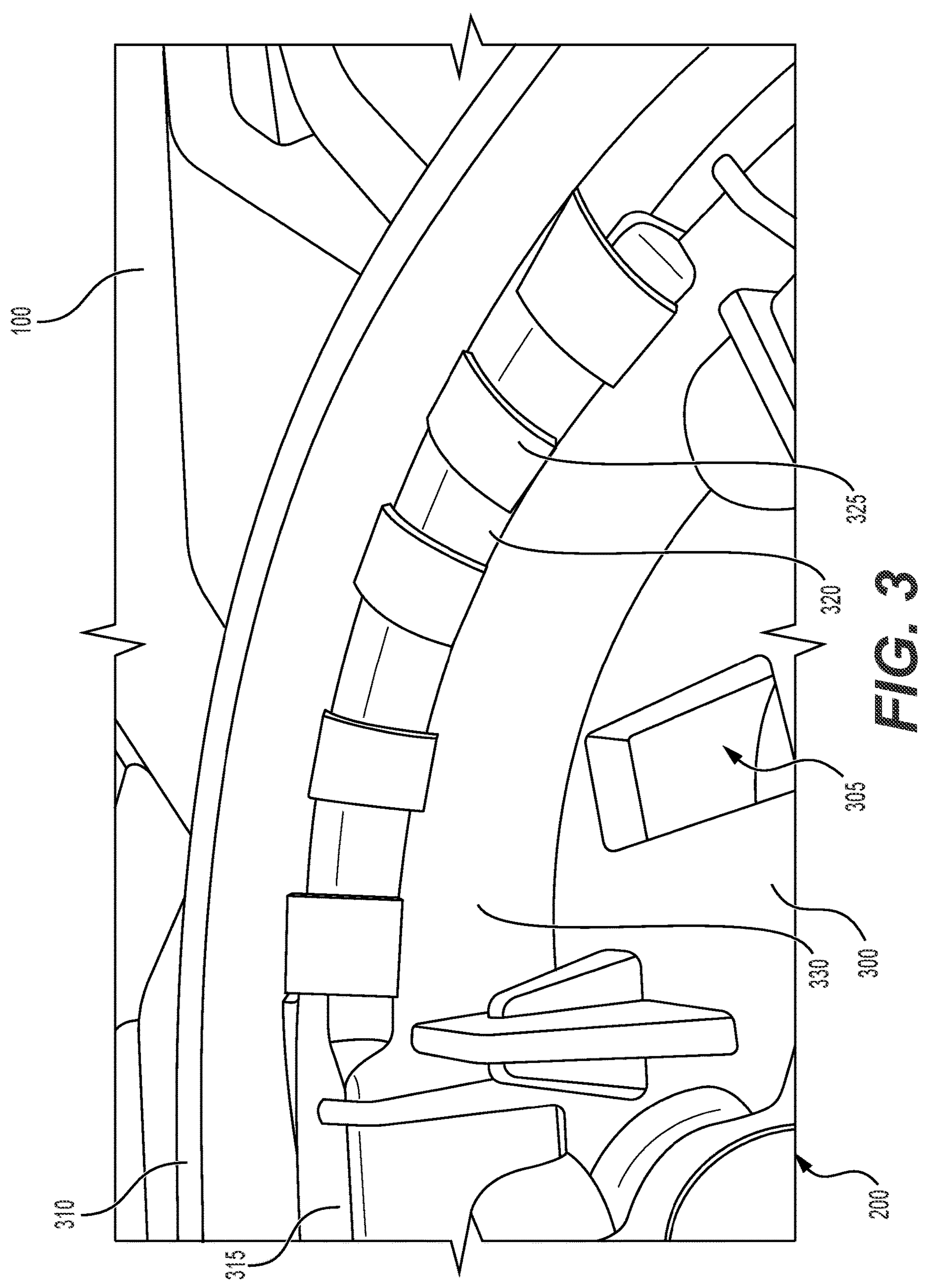
FIG. 3 illustrates a dentil shape noise countermeasure according to some embodiments.

Referring to FIG. 3, the recessed portion 200 may include various structures. The recessed portion 200 may include a lower surface 300 and a lower opening 305. For example, the lower surface 300 may be a surface generally defining a bottom portion of the recessed portion 200. The lower surface 300 of the recessed portion 200 may be generally parallel to a surface of the vehicle.

The lower surface 300 of the recessed portion 200 may be generally parallel to the grille assembly 100. The lower opening 305 may have a shape configured to receive a service clip of the fascia component 105. For example, the lower opening 305 may have a rectangular shape.

The recessed portion 200 may be defined by an upper edge portion 310. For example, the upper edge portion 310 may surround the recessed portion 200. The upper edge portion 310 of the recessed portion 200 may have a height that is above the lower surface 300. The upper edge portion 310 may define a portion of the surface of the vehicle. That is, the fascia component 105 may fit within at least a portion of the upper edge portion 310. The fascia component 105 may fit entirely within the upper edge portion 310, as illustrated in FIG. 1.

An intermediate surface 315 may extend around the recessed portion 200. The intermediate surface 315 may extend around an inner wall 330 of the recessed portion 200. For example, the intermediate surface 315 may be disposed between the upper edge portion 310 and the lower surface 300. The intermediate surface 315 may extend along a portion of the inner wall 330 of the recessed portion 200. For example, the intermediate surface 315 may extend along a portion of the upper edge portion 310. The intermediate surface 315 may extend along an entirety of the inner wall 330 of the recessed portion 200.

The inner wall 330 may be generally perpendicular to a surface of the vehicle. For example, the inner wall 330 may be generally perpendicular to the lower surface 300. In some example, the inner wall 330 and the lower surface 300 may form different angles to each other. For example, the lower surface 300 may be parallel to a direction of travel of the vehicle, while a surface of the vehicle is sloped away from the direction of travel, and the inner wall 330 may be perpendicular to the direction of travel.

The intermediate surface 315 may include a curved intermediate portion 320. The curved intermediate portion 320 may extend into the recessed portion 200. That is, the curved intermediate portion 320 may extend from the intermediate surface 315 into the recessed portion 200. The curved intermediate portion 320 may extend down towards the lower surface 300. The curved intermediate portion 320 may extend from the intermediate surface 315 down towards the lower surface 300.

A plurality of dentil protrusions may be formed on the intermediate surface 315. The plurality of dentil protrusions may extend over a portion of the curved intermediate portion 320. For example, the plurality of dentil protrusions may be formed on the intermediate surface 315 and the curved intermediate portion 320. In some embodiments, the plurality of dentil protrusions may extend from the inner wall 330.

A dentil protrusion 325 of the plurality of dentil protrusions may have a height between about 0.5 millimeters (mm) and above 1.5 mm above the intermediate surface 315. The dentil protrusion 325 may have a height of at least 0.5 mm. More particularly, the dentil protrusion 325 may have a height of about 1.0 mm.

A spacing between adjacent dentil protrusions of the plurality of dentil protrusions may be about 2 mm to about 8 mm. More particularly, the spacing between adjacent dentil protrusions of the plurality of dentil protrusions may be about 5 mm. The dentil protrusions may have widths between about 2 mm and about 8 mm. More particularly, each of the dentil protrusion 325 may have a width of about 5 mm.

Figure 4:
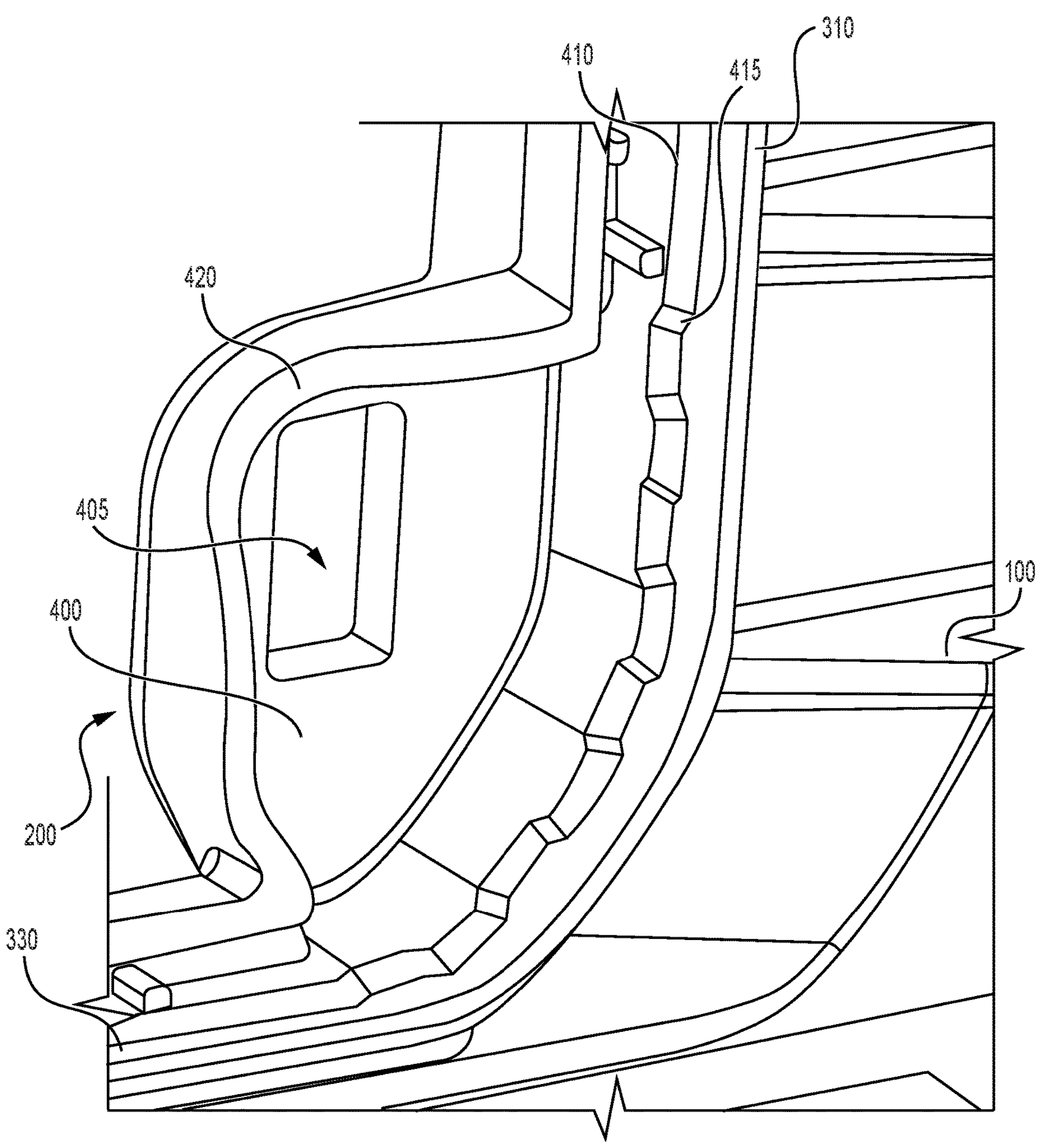
FIG. 4 illustrates a dentil shape noise countermeasure according to some embodiments.

FIG. 4 illustrates a dentil shape noise countermeasure according to some embodiments. Referring to FIG. 4, the recessed portion 200 of the grille assembly 100 may include a second lower surface 400 and a second lower opening 405. For example, the second lower surface 400 may be a surface generally defining a bottom portion of the recessed portion 200. The second lower surface 400 may be generally parallel to a surface of the vehicle.

The recessed portion 200 may be defined by the upper edge portion 310. The upper edge portion 310 may surround the recessed portion 200. A lower edge portion 410 may extend from the inner wall 330 of the recessed portion 200 defined by the upper edge portion 310 and into the recessed portion 200. The lower edge portion 410 may extend around a portion of the inner wall 330 of the recessed portion 200. In some examples, the lower edge portion 410 may extend around an entirety of the inner wall 330 of the recessed portion 200.

The lower edge portion 410 may include a plurality of indentures. The plurality of indentures may be formed in an upper surface of the lower edge portion 410. An indenture 415 of the plurality of indentures may have a depth between about 0.5 mm and 1.5 mm from an upper surface of the lower edge portion 410. The indenture 415 may have a depth of at least 0.5 mm. More particularly, the indenture 415 may have a depth of about 1.0 mm.

A spacing between adjacent indentures may be between about 2 mm and about 8 mm. More particularly, the indentures may have a spacing of about 5 mm. The indentures may have widths between about 2 mm and about 8 mm. More particularly, each of the indentures may have a width of about 5 mm.

The grill assembly 100 may include an inner upper edge portion 420 around the second lower surface 400. The inner upper edge portion 420 may extend around a portion of the recessed portion 200. The inner upper edge portion 420 may extend around an entity of the recessed portion 200, including the second lower surface 400.

Figure 5:
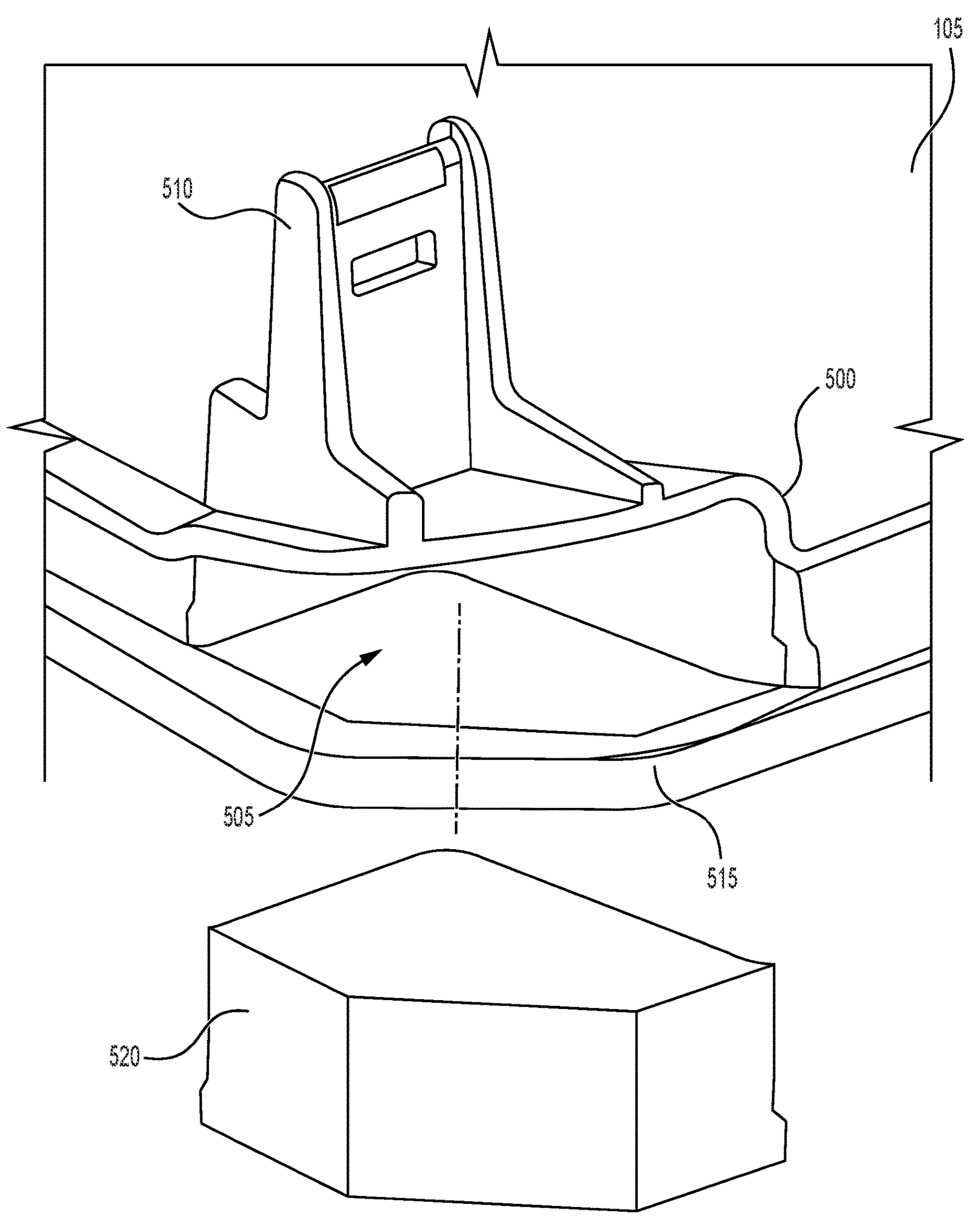
FIG. 5 illustrates a portion of a fascia component according to some embodiments.

FIG. 5 illustrates a portion of a fascia component according to some embodiments. Referring to FIG. 5, the fascia component 105 may include a house structure 500. The house structure 500 may extend from a rear surface of the fascia component 105. For example, in a case where the fascia component 105 is installed in the grille assembly 100, the house structure 500 of the fascia component 105 may be inserted into the recessed portion 200 of the grille assembly.

The fascia component 105 may include a void 505. The void 505 may be located below the house structure 500. The void 505 may be located between the house structure 500 and a front portion 515 of the fascia component 105.

The fascia component 105 may include one or more service clips. For example, the fascia component 105 may include a service clip 510. The service clip 510 may extend from the rear surface of the fascia component 105. For example, the service clip 510 may extend from the house structure 500. The service clip 510 may be disposed to fit within one of the lower openings, e.g., the lower opening 305 or the second lower opening 405. The service clip 510 may secure the fascia component 105 to the grille assembly 100.

In some examples, a blocking material 520 may be inserted into the void 505. The blocking material 520 may be, for example, a foam material or a rubber material. The blocking material 520 may prevent air from flowing into the void 505. The blocking material 520 may prevent wind noise cause be air flowing into or over the void 505.

The blocking material 520 may fill a portion of the void 505. The blocking material 520 may completely fill a portion of the void 505. The blocking material 520 may be disposed at an opening of the void 505, for example, where an inner portion of the void is not filled by the blocking material 520.

Referring again to FIG. 6 and FIG. 7, FIG. 6 illustrates a cross section of the grille assembly 100 and the fascia component 105 at line A-A' according to some embodiments and FIG. 7 illustrates a cross section of the grille assembly 100 and the fascia component 105 at line B-B' according to some embodiments. As illustrated in FIG. 6 and FIG. 7, the front portion 515 of the fascia component 105 may be form a portion of a surface of the vehicle. That is, the front portion 515 of the fascia component 105 may be exposed to an exterior of the vehicle.

As illustrated in FIG. 6, the gap 600 may be formed between the grille assembly 100 and the fascia component 105. The gap 600 may extend around a portion of the front portion 515 of the fascia component 105. The gap 600 may extend between the front portion 515 of the fascia component 105 and the upper edge portion 310 of the grill assembly 100. The gap 600 may completely surround the fascia component 105 in the recessed portion 200.

As shown in FIG. 6, the lower surface 300 and the lower opening 305 may be covered by the front portion 515 of the fascia component 105. For example, the lower surface 300 may be a surface generally defining a bottom portion of the recessed portion 200.

The lower opening 305 of the lower surface 300 may have a shape configured to receive the service clip 510 of the fascia component 105. The service clip 510 may secure the fascia component 105 to the grille assembly 100. For example, the service clip 510 may include a retaining portion 605. The retaining portion 605 may be formed of a resilient material, such as a plastic or metal material. The retaining portion 605 may cooperate with an edge of the lower surface 300 in the lower opening 305 to secure the fascia component 105 to the grille assembly 100.

In some embodiments, air flowing into the gap 600 flows over the intermediate surface 315 and the plurality of dentil protrusions, including the dentil protrusion 325. The air may be disrupted by the plurality of dentil protrusions. That is, the plurality of dentil protrusions may introduce turbulence into the air. Turbulent air may not generate noise. For example, the turbulent air may not whistle.

Similarly, the air flowing into the gap 600 flows over the lower edge portion 410 and the plurality of indentures, including the indenture 415. The air may be disrupted by the plurality of indentures. That is, the plurality of indentures may introduce turbulence into the air. The turbulent air may not generate noise. For example, the turbulent air may not whistle.

Accordingly, the dentil protrusions and the plurality of indentures may be a first noise countermeasure configured to reduce or eliminate wind noise. In some embodiments, the first noise countermeasure may be configured to reduce or eliminate wind noise cause by air flowing into the gap without sealing the gap 600.

In some cases the turbulent air generated by the first noise countermeasures may have a tuned pitch, different than if the first noise countermeasures were omitted. For example, a pitch of the wind noise may be tuned according to a height of the first noise countermeasures. In another example, a pitch of the wind noise may be tuned according to a spacing of the first noise countermeasures. The tuned pitch may have a lower volume, may be less audible, or may be more pleasing to an occupant of the vehicle.

In some embodiments, air flowing into the gap 600 may be prevented from entering a portion of the void 505 by the blocking material 520 (see FIG. 5). The air that is prevented from entering a portion of the void 505 may not generate noise. Accordingly, the blocking material 520 disposed in the void 505 may be a second noise countermeasure. In some embodiments, the second noise countermeasure may be configured to reduce or eliminate wind noise cause by air flowing behind the fascia component 105 without sealing the gap 600.

In some embodiments, the first noise countermeasure and the second noise countermeasure may be used alone or in combination with each other.

As illustrated in FIG. 7 the grille assembly 100 may include a backing surface 700. The backing surface 700 may extend around a portion of the recessed portion 200. According to some embodiments, the first noise countermeasure, for example, the plurality of dentil protrusions or the plurality of indentures, may extend over the backing surface 700. For example, the plurality of dentil protrusions may include protrusions formed on the backing surface 700. In another example, the plurality of indentures may include indentures form in the backing surface 700.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

We claim:

1. A recessed portion of a vehicle surface comprising:
- an upper edge portion surrounding a portion of the recessed portion;
- an inner wall of the recessed portion;
- a plurality of dentil protrusions extending from the inner wall; and
- a fascia component disposed in a portion of the recessed portion,
- wherein a gap is defined between the fascia component and the upper edge portion and at least some of the plurality of dentil protrusions are disposed in an air channel formed by the gap.

2. The recessed portion of the vehicle surface of claim 1, further comprising an intermediate surface extending around a portion of the inner wall below the upper edge portion.

3. The recessed portion of the vehicle surface of claim 2, wherein the plurality of dentil protrusions are formed on the intermediate surface.

4. The recessed portion of the vehicle surface of claim 2, further comprising a lower surface extending from the inner wall, wherein the intermediate surface is disposed between the lower surface and the upper edge portion.

5. The recessed portion of the vehicle surface of claim 4, wherein the fascia component comprises a service clip extending through an opening in the lower surface.

6. The recessed portion of the vehicle surface of claim 2, further comprising a curved intermediate portion extending from the intermediate surface into the recessed portion.

7. The recessed portion of the vehicle surface of claim 6, wherein the plurality of dentil protrusions are formed on the curved intermediate portion.

8. The recessed portion of the vehicle surface of claim 1, wherein the plurality of dentil protrusions have a height between about 0.5 millimeters and about 1.5 millimeters and a spacing between adjacent ones of the dentil protrusions between about 2 millimeters and about 8 millimeters.

9. The recessed portion of the vehicle surface of claim 1, wherein the plurality of dentil protrusions have a height of about 1 millimeter and a spacing between adjacent ones of the dentil protrusions between about 5 millimeters.

10. The recessed portion of the vehicle surface of claim 1, wherein the fascia component comprises:

a house structure extending to a rear of the fascia component;

a void disposed between the house structure and a front portion of the fascia component; and a blocking material disposed in the void.

11. A vehicle comprising:

a fascia component disposed on a surface of the vehicle, including:

a front portion;

a house structure extending to a rear of the fascia component, away from the front portion;

the house structure having a perimeter defining a void extending toward the rear of the fascia component from the front portion of the fascia component; and a blocking material disposed in the void;

the house structure defining a recessed portion of the surface of the vehicle;

wherein the recessed portion includes:

an upper edge portion surrounding a portion of the recessed portion;

an inner wall of the recessed portion; and a plurality of dentil protrusions extending from the inner wall in an air channel formed by a gap defined between the upper edge portion and the blocking material.

* * * * *